(12) United States Patent
Volpe et al.

(10) Patent No.: US 11,281,967 B1
(45) Date of Patent: Mar. 22, 2022

(54) EVENT-BASED DEVICE PERFORMANCE MONITORING

(71) Applicant: Amazon Technologies, Inc., Seattle, WA (US)

(72) Inventors: Thomas A. Volpe, Austin, TX (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 590 days.

(21) Appl. No.: 16/216,855

(22) Filed: Dec. 11, 2018

(51) Int. Cl.
*G06N 3/063* (2006.01)
*G06N 3/04* (2006.01)
*G06F 11/34* (2006.01)
*G06F 9/30* (2018.01)

(52) U.S. Cl.
CPC ......... *G06N 3/063* (2013.01); *G06F 9/30101* (2013.01); *G06F 11/3466* (2013.01); *G06N 3/049* (2013.01)

(58) Field of Classification Search
CPC .. G06F 9/542; G06F 11/3466; G06F 9/30101; G06N 3/063; G06N 3/02; G06N 3/10; G06N 20/00; G06N 3/049
See application file for complete search history.

(56) References Cited

U.S. PATENT DOCUMENTS

| | | | |
|---|---|---|---|
| 7,379,860 B1 | 5/2008 | Bartz et al. | |
| 7,681,078 B2 | 3/2010 | Moyer | |
| 7,865,771 B2 | 1/2011 | Yang | |
| 7,962,314 B2* | 6/2011 | Chernoff | G06F 9/542 |
| | | | 702/186 |
| 8,095,917 B2 | 1/2012 | Stall | |
| 8,499,287 B2* | 7/2013 | Shafi | G06F 8/314 |
| | | | 717/125 |
| 8,578,213 B2* | 11/2013 | Han | G06F 11/3636 |
| | | | 714/38.1 |
| 9,092,332 B2* | 7/2015 | Taylor | G06F 11/3466 |
| 9,104,599 B2 | 8/2015 | Atkisson et al. | |
| 9,442,842 B2* | 9/2016 | Yadav | G11C 11/5628 |
| 2008/0010621 A1 | 1/2008 | Williams | |
| 2009/0049312 A1 | 2/2009 | Min | |
| 2010/0332909 A1 | 12/2010 | Larson | |

(Continued)

OTHER PUBLICATIONS

"Embedded Trace Buffer", Texas Instruments Wiki, Available online at https://processors.wiki.ti.com/index.php/Embedded_Trace_Buffer, 2020, 10 pages.

(Continued)

*Primary Examiner* — Benjamin P Geib
(74) *Attorney, Agent, or Firm* — Kilpatrick Townsend & Stockton LLP

(57) ABSTRACT

An integrated circuit is configurable to generate a notification message when an indicator of an event used to synchronize the execution of different functional blocks of the integrated circuit changes status. The indicator of the event is cleared when an operation is triggered and is set when the operation completes. The notification message includes a timestamp indicating the time when the indicator of the event changes status. The notification message is used to determine the execution timeline of a set of instructions executed by integrated circuit and to identify bottlenecks in the set of instructions or the integrated circuit.

18 Claims, 9 Drawing Sheets

(56) References Cited

U.S. PATENT DOCUMENTS

| | | |
|---|---|---|
| 2012/0124047 A1 | 5/2012 | Hubbard |
| 2013/0346594 A1 | 12/2013 | Banerjee et al. |
| 2014/0305525 A1 | 10/2014 | Le Moing et al. |
| 2015/0100767 A1 | 4/2015 | Topham |
| 2015/0100842 A1 | 4/2015 | Rao et al. |
| 2016/0142940 A1 | 5/2016 | Teo et al. |
| 2017/0083434 A1 | 3/2017 | Potash |
| 2017/0083464 A1 | 3/2017 | Potash |
| 2018/0365017 A1 | 12/2018 | Shirvani et al. |

OTHER PUBLICATIONS

Volpe et al., U.S. Appl. No. 16/145,050, "Notifications in Integrated Circuits," filed Sep. 27, 2018.
Volpe et al., U.S. Appl. No. 16/146,834, "Reconfigurable Instruction," filed Sep. 28, 2018.
Volpe et al., U.S. Appl. No. 16/200,602, "Configurable Reporting for Device Conditions," filed Nov. 26, 2018.
Volpe et al., U.S. Appl. No. 16/200,620, "Operational Management of a Device," filed Nov. 26, 2018.
Bshara et al., U.S. Appl. No. 16/216,873, "Execution Synchronization and Tracking," filed Dec. 11, 2018.

\* cited by examiner

EVENT-BASED DEVICE PERFORMANCE MONITORING

BACKGROUND

A complex computer system, such as a neural network processor, may include multiple processing units functioning in parallel. For example, a neural network may include multiple layers of processing nodes. Each processing node on a layer may perform computations on data generated by processing nodes on the preceding layer to generate new output data. In many implementations, in order to improve the performance, the complex computer system may be configured to perform parallel processing using complex circuits that may include multiple processing units or processing engines. Due to the complexity of the software and hardware of the complex computer system configured for parallel processing, it may be very difficult to determine the low-performing portions of the computer system or instruction set, such as the specific layer(s), node(s), or operation(s) of the neural network, in order to improve the performance of the computer system.

BRIEF DESCRIPTION OF THE DRAWINGS

Various embodiments in accordance with the present disclosure will be described with reference to the drawings, in which.

DETAILED DESCRIPTION

Figure 1:
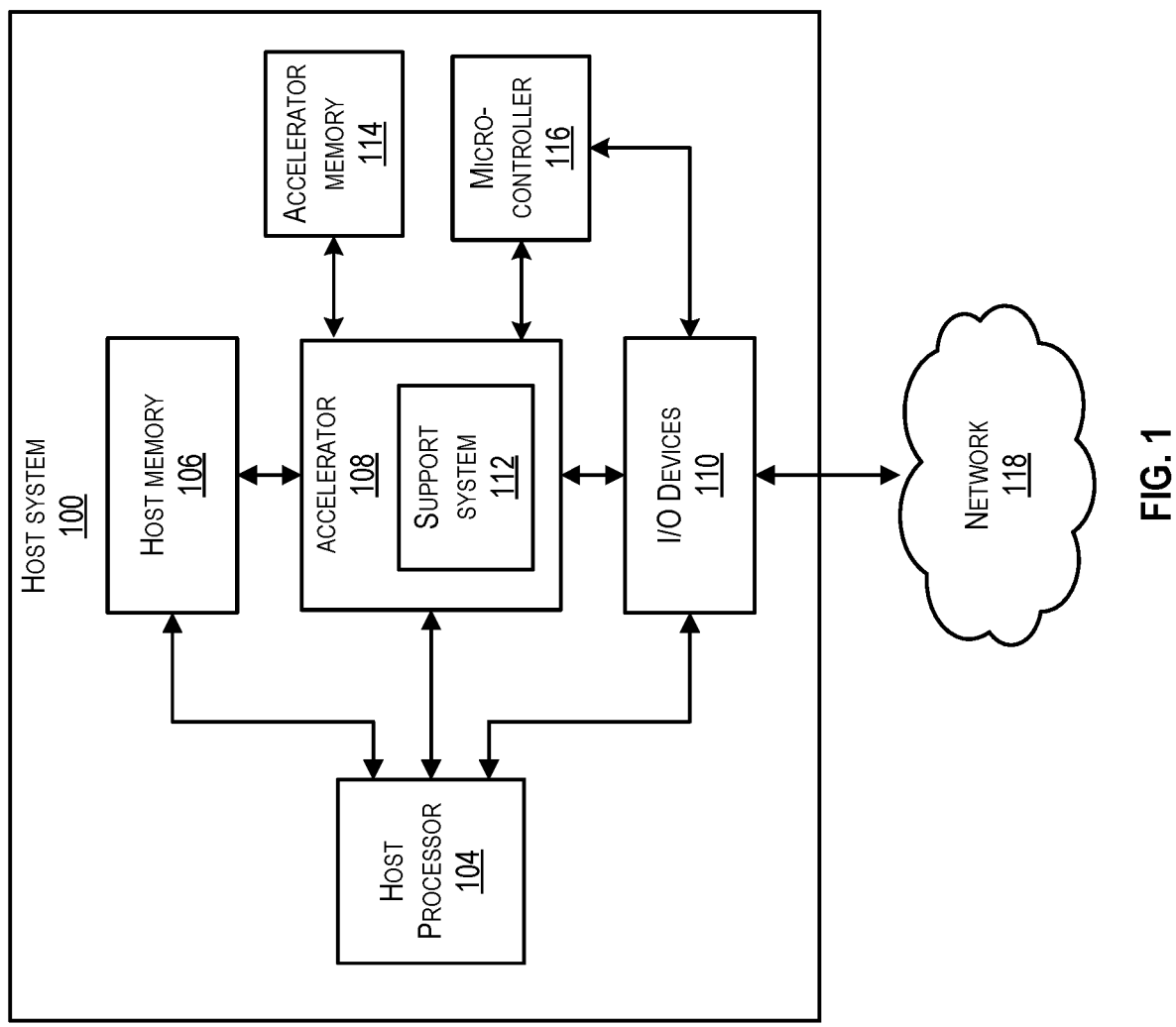
FIG. 1 is a block diagram of an example of a host system according to certain embodiments.

Techniques disclosed herein relate generally to analyzing and debugging the performance of a complex computing system, such as neural networks (e.g., deep neural networks). Due to the complexity of the software and hardware of the complex computing system that may be configured for parallel processing, it may be very difficult to determine the low performing portions of the computing system and/or the instruction set. For example, a neural network may include multiple processing engines and each processing engine may run independently in multiple threads to perform millions or billions of arithmetic operations that may have data or resource dependency. In many cases, the software (e.g., instructions) and hardware of the initially implemented neural network may not be optimized and thus the performance (e.g., speed) of the neural network may not be as high as desired. Because of the large circuitry, the large amount of computation performed by the neural network, and the parallel execution of different operations by different processing engines, it may be difficult to accurately identify the software instructions or hardware circuits that may be the bottlenecks of the neural network or may cause the lower than desired performance of the neural network.

According to certain embodiments, event notification messages indicating the set time and the clear time of event indicators associated with various events may be generated automatically when the event indicators are set and cleared. The events may be used for synchronizing the transportation of data or instructions to various circuits and the execution of the various circuits in a computing system. No explicit instructions are used to generate and save these event notification messages. Thus, the performance of the circuits of the computing system is not negatively affected by the generation of these event notification messages. The event notification messages generated by the various circuits may be saved to a memory device and may be read back later for analysis. For example, based on the correlations between the user commands, compiled instructions and operations, and the set time and clear time of each event indicator, actual execution time, latency, and/or bandwidth usage for individual user commands and instructions or operations by the circuits may be determined. As such, possible bottlenecks of the computing system, such as operations or user commands for the network that may take a long time to perform before other operations can be performed, may be identified. The computing system may then be improved by, for example, modifying the hardware resources, assigning operations to different functional blocks, modifying the network model, and the like.

Techniques disclosed herein may be used to track the parallel execution of operations by multiple function blocks of a computing system in a pipeline, in multiple threads, or using superscalar techniques. Two timestamps may be generated and saved for each event that may depend on the completion of other events or may need to complete before other event indicators may be set or cleared. Thus, the correlation between the events and the potential software and/or hardware bottlenecks of the neural network may be identified.

Because no explicit instructions need to be generated and executed for generating these event notification messages, the event notification messages are small in size, and the events occur at a relatively low frequency compared with the clock frequency, the processing resources and data transportation bandwidth used for generating and transmitting the timestamps may be very low and the memory space used to store the timestamps may be small. In some embodiments, the event notification generation can also be disabled for all events or only some selected events. As such, the event notification generation may have a minimum or negligible impact on the performance of the computing system, and may instead help to improve the performance of the computing system by identifying the bottlenecks.

As used herein, an "event" or an "event indicator" may refer to an indicator of an execution status of an operation associated with one or more instructions. An event or event indicator may be a flag that can be set or cleared to indicate whether an operation is being performed or has been completed. An event or event indicator may be set by writing, for example, a logic "1" to a register, and may be cleared by writing, for example, a logic "0" to the register. Events may be used to synchronize the operations of different functional blocks of a circuit. For example, one functional block may need to wait for another functional block to complete an operation (which may be indicated by a change of status of the event) before starting an operation. In one specific example, a convolution engine in a neural network processor may need to wait for a DMA engine to move a dataset from a memory to a local buffer before starting to perform the convolution on the dataset. To enforce such an order of execution, a coordination engine may trigger the data movement by the DMA and clear an event (more specifically, an indicator of the event) associated with the data movement. The coordination may not trigger the convolution engine to perform convolution on the dataset before the data movement is complete, which may be indicated by the event indicator being set by, for example, the DMA engine. After the event indicator is set, the coordination engine may trigger the convolution on the dataset by the convolution engine.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 is a block diagram of an example of a host system 100 according to certain embodiments. Host system 100 can include an accelerator 108, a host processor 104, a host memory 106, and I/O devices 110. In some embodiments, accelerator 108 may include a support system 112 and may be coupled to a microcontroller 116 and an accelerator memory 114. In some implementations, host system 100 may include other hardware that is not illustrated here.

Host processor 104 may include a general purpose integrated circuit that is capable of executing program instructions. Host processor 104 can also be referred to as a CPU. Host processor 104 may be responsible for the overall management and control of host system 100, including executing an operating system for host system 100. In some examples, host processor 104 may include multiple processing cores. In some examples, host system 100 may include more than one host processor. In some examples, host processor 104 and accelerator 108 may be one chip, such as, for example, one or more integrated circuits within the same package. In some examples, host processor 104 may communicate with accelerator 108 using a PCIe interface or other suitable interface.

Host memory 106 can include memory that is used by host processor 104 for storage of program code executed by host processor 104, as well as for storage of values that are being operated on by host processor 104. Host memory 106 may be a DRAM, an SDRAM, an SRAM, or any volatile and/or non-volatile memory in various implementations. In some examples, accelerator memory 114 may include memory for accelerator 108. Accelerator memory 114 may be an SRAM, or any volatile and/or non-volatile memory. In some other examples, host memory 106 may also be accessible to accelerator 108. For example, host memory 106 may include separate memory or memory banks for host processor 104 and for use by accelerator 108.

I/O devices 110 may include hardware for connecting to user input and output devices, such as keyboards, monitors, and printers, among other devices. I/O devices 110 may also include storage drives and/or a network interface for connecting to a network 118.

In various implementations, support system 112 can include hardware for coordinating the operations of accelerator 108. For example, support system 112 may include one or more data management processors, which may manage movement of data into and out of accelerator 108. In some examples, support system 112 may be a part of accelerator 108. In some examples, support system 112 may not be a part of accelerator 108. In some examples, the data management processors and accelerator 108 can be on one device, such as one integrated circuit on the same die and in the same package.

The software programs executing on host processor 104 can receive or generate input for processing by accelerator 108. The programs may include, for example, graphics intensive programs such as computer-aided design programs, computationally intensive programs such as modeling programs, or artificial intelligence programs such as speech recognition or image recognition programs. In various examples, host processor 102 can determine to offload operations on input received from such programs to accelerator 108, which may perform the operations more quickly than host processor 102.

To assist host processor 104 in using accelerator 108, host processor 104 may execute a device driver or driver program for accelerator 108. Similar to any other hardware driver, the driver program for accelerator 108 may provide an interface through which an operating system can send requests to accelerator 108 and receive results. Upon receiving a request, which may include data and an operation to be performed on the data, the driver program can handle execution of the operation by accelerator 108, leaving the operating system free to perform other operations.

In various examples, handling a request for accelerator 108 may include programming and activating a data management processor, which may be a component in support system 112 or elsewhere in accelerator 108. Programming the data management processor can include, for example, triggering a DMA transaction to copy program code or data from host memory 106 to the data management processor, and triggering the data management processor to execute the code. Once the data management processor begins executing code, the driver program need not take further action until the operation being performed by accelerator 108 is finished.

In various examples, the code executed by the data management processor may configure accelerator 108, including copying program code and input data into accelerator 108 and triggering accelerator 108 to begin execution of the code. The data management processor may wait on accelerator 108 to finish performing the operation, and may then copy any result of the operation from accelerator 108 into host memory 106. The data management processor can then inform the driver program that results are ready, which can then inform the operating system or the program for which the result was computed.

In certain implementations, accelerator 108 and the data management processor of support system 112 may support their respective configurable reporting mechanisms. In certain embodiments, each of accelerator 108 and the data management processor of support system 112 may maintain their own queue for notification messages which may not be visible to one another. For example, a first queue for storing notification messages generated by the data management processor may be managed and configured by a driver executing on host processor 104. The first queue may be maintained in host memory 106. The driver executing on host processor 104 may also be responsible for configuring a first set of the reporting configuration register and the condition mask register in the data management processor to allow configurable reporting of the conditions detected in the data management processor.

Microcontroller 116 may include a general purpose microcontroller configured to execute firmware to manage accelerator 108. For example, microcontroller 116 may configure the reporting mechanisms in accelerator 108 according to certain embodiments. The second queue may be maintained in accelerator memory 114. In some implementations, accelerator memory 114 may be integrated with the accelerator 108. The driver executing on host processor 104 may not have access to the second queue for accelerator 108, and microcontroller 116 may not have access to the first queue for the data management processor. In some implementations, microcontroller 116 may have higher privileges than the driver executing on host processor 104, for example, the driver executing on host processor 104 may belong to a user space. Thus, certain embodiments can allow different reporting options for the conditions detected in different processors within the same system.

Figure 2:
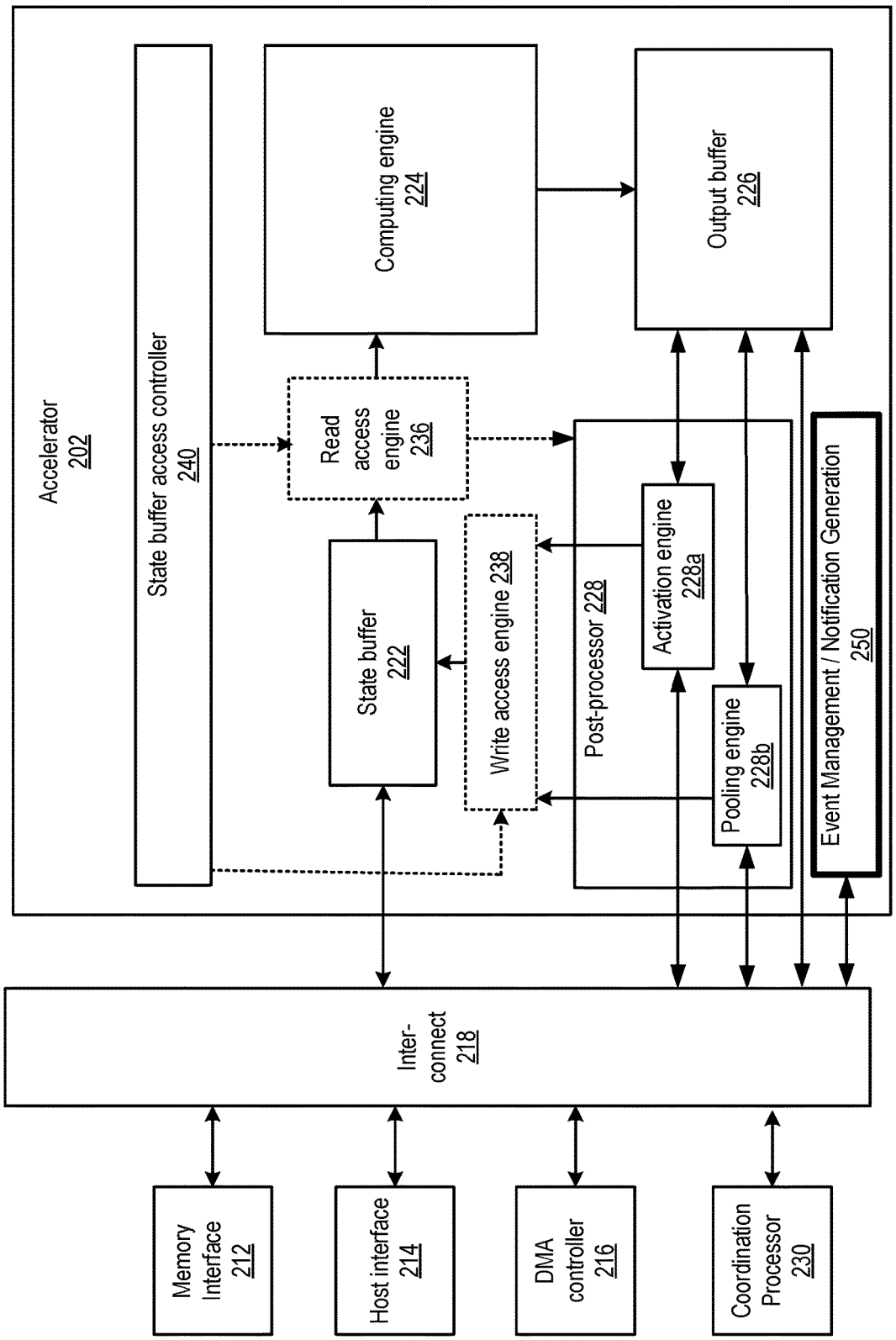
FIG. 2 illustrates an example apparatus for an example artificial neural network according to certain embodiments.

FIG. 2 illustrates an example apparatus 200 for an example artificial neural network. Apparatus 200 may be part of a computer system, such as a data center server or host system 100. In some embodiments, apparatus 200 may be part of a multi-tenant compute service system (e.g., a cloud) and may communicate with a host device (not shown in FIG. 2) to provide computing and memory resources for a computing service. Apparatus 200 may include an accelerator 202 (such as a part of accelerator 108) coupled to a memory interface 212 (such as a memory controller), a direct memory access (DMA) controller 216, and a host interface 214 via an interconnect 218. Apparatus 200 may also include a coordination processor 230, which may be part of support system 112, such as a data management processor as described above and in detail below. Accelerator 202 may provide computing resources to support inference using a trained neural network. More detail of the operation of accelerator 202 is described below.

Memory interface 212 may be connected to a memory device (e.g., host memory 106 or accelerator memory 114) configured to store executable instructions, input data (e.g., pixel data of images), and weights (e.g., the filter parameters) or other parameters of the trained neural network received from, for example, a host device. The memory device may also be used to store the output of accelerator 202 (e.g., one or more image recognition decisions on the input images) or some intermediary data. The memory device may include any suitable memory, such as dynamic random access memory (DRAM), synchronous DRAM (SDRAM), double data rate DRAM (DDR DRAM), storage class memory (SCM), flash memory devices, etc.

DMA controller 216 may be configured to perform DMA operations to transfer data between accelerator 202 and the host device or the memory device (e.g., through memory interface 212). For example, the host device may store the instructions, input data, the weights, and other parameters of the neural network at the memory device connect to memory interface 212. The host device may provide the memory addresses for the stored instructions, data, weights, and other parameters of the neural network to accelerator 202 (e.g., in the form of memory descriptors). Accelerator 202 may then obtain the stored instructions, data, weights, or other parameters of the neural network using DMA controller 216 based on the memory addresses provided by the host device. Accelerator 202 may also store the results of computations (e.g., one or more image recognition decisions or intermediary data) at the memory device through memory interface 212, and provide the memory addresses for the stored results to the host device.

Host interface 214 may enable communications between the host device and accelerator 202. For example, host interface 214 may be configured to transmit the memory descriptors including the memory addresses of the stored data (e.g., input data, weights, results of computations, etc.) between the host device and accelerator 202. Host interface 214 may include, for example, a peripheral component interconnect express (PCIe) interface or any suitable interface for communicating with the host device.

Accelerator 202 may provide the computing resources to support the neural network computations for inference, such as image classification. In the example shown in FIG. 2, accelerator 202 may include an integrated circuit, such as a system-on-chip (SoC), FPGA, or ASIC. Accelerator 202 may include a number of circuit components, such as a state buffer 222, a computing engine 224, an output buffer 226, and a post-processor 228. In some implementations, accelerator 202 may also include a read access engine 236 and a write access engine 238 to provide computing engine 242 and post-processor 228 with read and write access to state buffer 222 as discussed in detail below.

State buffer 222 may be configured to provide caching of data used for computations at computing engine 224. The data cached at state buffer 222 may include, for example, the input data and weights obtained from the memory device through memory interface 212, output data from computing engine 224, and/or output data from post-processor 228. The caching may reduce the effect of memory access bottleneck (e.g., caused by the latencies at memory interface 212, DMA controller 216, interconnect 218, etc.) on the performance of computing engine 224. State buffer 222 may be an on-chip memory device and may include, for example, static random access memory (SRAM). In some embodiments, state buffer 222 may be partitioned based on the organization of computing engine 224. For example, state buffer 222 may include multiple SRAM banks, where each bank may be configured to store input data and weights for a row of computing engine 224.

Computing engine 224 may include an array of processing elements (PEs) configured to perform one or more arithmetic operations (e.g., vector multiplication) for neural network computations. In some implementations, computing engine 224 may be a matrix multiplication unit that may be used for matrix convolution and/or matrix multiplication, and thus may be used to implement a convolution layer or a fully-connected layer of the neural network. For example, in some implementations, computing engine 224 may include a systolic array that includes a two-dimensional array of processing elements arranged in rows and columns for matrix multiplication. In some implementations, computing engine 224 may include circuits for quantizing input data before performing the arithmetic operations (e.g., from floating point numbers to integer numbers) so as to reduce the complexity of the arithmetic operations.

Post-processor 228 may be configured to perform post-processing on the outputs of computing engine 224 that may be stored in output buffer 226. In the example shown in FIG. 2, post-processor 228 may include an activation engine 228a and a pooling engine 228b. Activation engine 228a may perform one or more activation (non-linear) functions, such as tan h, sigmoid, ReLU, etc., on the outputs of a convolution layer to generate the output data, and store the output data in state buffer 222. In some implementations, activation engine 228a may also include one or more multiplier circuits. In some implementations, activation engine 228a may also perform de-quantization between layers. Pooling engine 228b may perform, for example, maximum pooling, average pooling, etc., on the outputs of a convolution layer or activation engine 228a to generate subsamples, and store the subsamples in state buffer 222. In some implementations, pooling engine 228b may also include one or more multiplier circuits. In some implementations, pooling engine 228b may also perform residue-add for residual learning (e.g., to implement a ResNet) or other arithmetic logic operations. Pooling engine 228b and/or activation engine 228a may also be controlled to be skipped for certain convolution layers. For example, as discussed above, a CNN may perform multiple convolution and ReLU operations before performing a pooling operation.

In some implementations, post-processor 228 may also include a Softmax engine (not shown in FIG. 2) that can perform a Softmax function on the output of the fully-connected layer. As described above, the Softmax engine may take a vector of real-valued scores from a fully-connected layer and map the vector of real-valued scores to a vector of probability values between zero and one that sum to one.

Read access engine 236 may provide read access to state buffer 222 for a read access requesting device including, for example, computing engine 224 and post-processor 228. Write access engine 238 may provide write access to state buffer 222 for a write access requesting device including, for example, post-processor 228. Each of read access engine 236 and write access engine 238 may convert a sequential series of access operations (e.g., multiple read or write operations across multiple clock cycles) to a single access operation to reduce power and reduce wait latency. Each of read access engine 236 and write access engine 238 may be organized based on state buffer 222. For example, each of read access engine 236 and write access engine 238 may include multiple sub-engines corresponding to multiple SRAM banks of state buffer 222, with each sub-engine providing access to a corresponding SRAM bank. A sub-engine of read access engine 236 may convert a sequential series of read access operations to a corresponding SRAM bank for multiple data elements (e.g., by a row of computing engine 224 or by post-processor 228) to a single read access for the multiple data elements. A sub-engine of write access engine 238 may also convert a sequential series of write accesses for storing multiple data elements at the corresponding SRAM bank (e.g., by post-processor 228) to a single write access for the multiple data elements.

In some embodiments, accelerator 202 may also include an event management and notification generation unit 250. Events may be used to enforce dependencies or ordering between instructions running on different engines, which may be synchronized or not synchronized. For example, event management and notification generation unit 250 may manage events, for example, for synchronizing DMA data movement, processing engine execution, software breakpoints, etc., and/or generate notification messages that include information for debug purposes.

In some embodiments, coordination processor 230 may also include an event management and notification generation unit for handling the parallel processing and coordinating the operations of the different processing engines in accelerator 202 and DMA controller 216 as described in details below. The event management and notification generation unit in coordination processor 230 may also manage events, for example, for synchronizing DMA data movement, processing engine execution, software breakpoints, etc., and/or generate notification messages that include information for debug purposes.

One or more accelerators 202 may be used to implement a deep neural network that may include multiple sets of convolution, activation, and pooling layers. For example, accelerator 202 may first receive input data and instructions for implementing a first set of convolution, activation, and/or pooling layers. The input data may include the network parameters for the first set of network layers, such as the number of nodes, the weights, or the parameters of the filters, etc. The input data may also include the external input data to be processed by the neural network or intermediate output data from previous layers of the neural network. The instructions may include instructions for computing engine 224, activation engine 228a, and/or pooling engine 228b. After the input data are processed by the first set of network layers, new input data and instructions for implementing a second set of convolution, activation, and/or pooling layers may be received by accelerator 202. The new input data may include parameters for the second set of network layers and intermediate output data from the previous layers, and the new instructions may include the instructions to be executed by the processing engines to implement the second set of network layers. In this way, an accelerator 202 may be used to implement multiple sets of network layers. As such, a deep neural network (e.g., a ResNet-50 network with 50 layers) may be implemented using a smaller number (e.g., 1, 2, 4, or 8) of neural network processors.

A neural network that has been trained may be represented by a neural network model that may describe the network architecture (e.g., layers and connection between nodes on the layers) and various parameters associated with the neural network. The neural network model may be a functional model described in a higher level programming language or hardware description language, such as C, C++, C#, Java#, python, R, Haskell, D, Ocaml, LISP, MatLab, etc. The neural network model may be compiled by a compiler to generate executable instructions. The compiler may convert a neural network model into machine-executable instructions, such as binary instructions, that may be executed by various functional blocks (e.g., processing engines) of the neural network. The compiler may manage the allocation of different operations of the neural network to various hardware resources (e.g., processing engines), the allocation of memory for storing neural network parameters and intermediate data, and the timing and synchronization conditions between the various hardware resources. For example, the compiler may assign an multiplication operation to a PE array or an activation engine.

In some embodiments, the compiler may maintain a list of available hardware resources and the functions and usage of the hardware resources of the neural network, and assign operations of the neural network to appropriate hardware resources based on the functions and usage of the hardware resources. The compiler may specify the source memory address where the input data for an operation may be stored, and allocate memory space for storing the output data for the operation. The compiler may also determine the order of the operations to be executed by the various processing engines. The compiler may manage the synchronization between the processing engines. For example, the compiler may determine that a second operation by a processing engine may not start until the completion of a first operation by another processing engine, such as after the output data of the first operation has been written into a memory device.

The compiler may generate executable instructions to be executed by the processing engines. In some embodiments, one set of instructions may be generated for each respective processing engine. The instructions may include machine readable and executable code, such as binary code. The instructions may include certain timing for the instructions, such as the wait time between two instructions or the conditions to be met before starting an instruction. During run time, the instructions may be loaded into the respective instruction buffers for the processing engines and executed by the processing engines.

The compiler may be used to generate instructions for executing by different functional blocks in parallel (e.g., instruction level parallelism) to maximize the performance of the computing system. Several techniques may be used to achieve the instruction level parallelism, such as, for example, multi-threading, pipelining, and superscalar processing. Pipelining may use a fixed latency between the different stages (e.g., dictated by the worst-case latency), enforce strict ordering between stages, and may incur certain inefficiencies (e.g., pipeline bubbles).

For example, in the multi-threading technique, each processing engine may run its own set of instructions. In the superscalar technique, a single set of instructions may be sequenced to different processing engines. To reduce hardware complexity, the multi-threading technique may be selected over the superscalar technique. The compiler may generate a set of instructions for each respective processing engine, such as the PE-array, activation engine, or pooling engine, and the processing engines may execute the sets of instructions synchronously or asynchronously, where the execution of the instructions by the different processing engines may be coordinated through events as described in detail below. The asynchronous execution of the instructions by the different processing engines may allow fine-grained software control and enable weight-loading (to the PE array) and matrix-multiplication (by the PE array) in parallel.

In some embodiments, the compiler may determine a set of events that can be used to synchronize the parallel execution of different processing engines or other functional blocks. In some embodiments, some events may correspond to certain labels in the network model defined by users.

Figure 3:
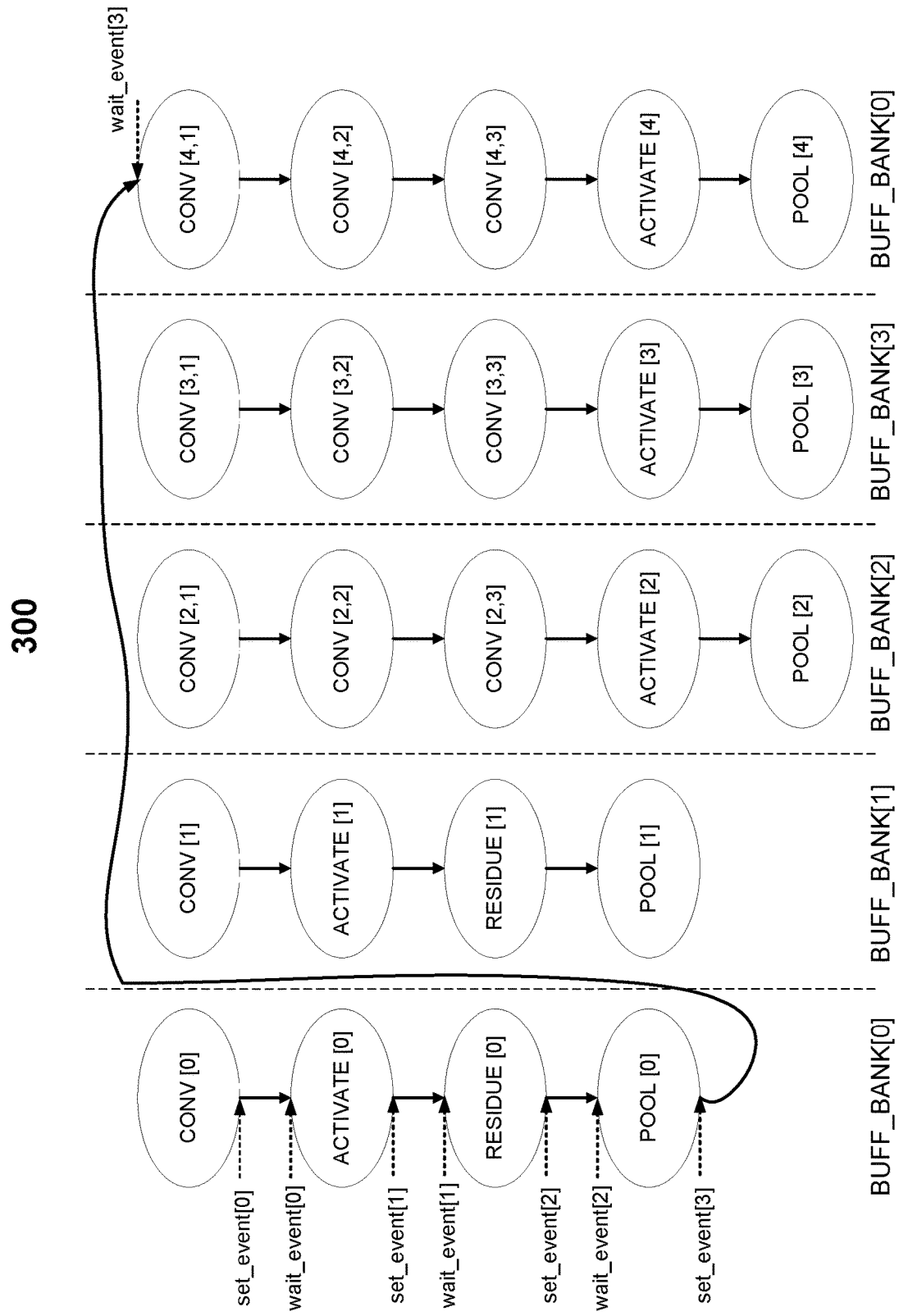
FIG. 3 illustrates an example of using events to coordinate multi-thread processing for improving the performance of a neural network according to certain embodiments.

FIG. 3 is a flow diagram 300 illustrating an example of using events to coordinate multi-thread processing for improving the performance of a neural network. Each processing engine may perform its own set of operations or instructions in serial. For example, the convolution engine (e.g., the PE array) may execute convolution operations CONV[0], CONV[1], CONV[2,1], CONV[2,2], CONV[2, 3], CONV[3,1], CONV[3,2], CONV[3,3], CONV[4,1], CONV[4,2], and CONV[4,3] in serial. Similarly, the activation engine may execution activation operations ACTIVATE[0], ACTIVATE[1], ACTIVATE[2], ACTIVATE[3], and ACTIVATE[4] in serial.

In the example shown in FIG. 3, there is no implicit dependency between operations performed on different processing engines, and each processing engine may perform its operations in serial. The order of performing the operations by the different processing engines may only be enforced when there is a data or resource dependency between the operations. Thus, the pipeline bubbles (idle time) may be reduced or avoided. The order of performing the operations by the different processing engines, when needed, may be enforced through events.

For example, there may be data dependency between operation CONV[0] and operation ACTIVATE[0] because operation ACTIVATE[0] may use data generated by operation CONV[0]. In addition, operations in each column shown in FIG. 3 may use a same bank in an output buffer of the neural network processor, such as output buffer 226 of accelerator 202. Thus, the operations in each column shown in FIG. 3 may have both data dependency and resource dependency. In addition to operations CONV[0], ACTIVATE[0], RESIDUE[0], and POOL[0] in the first column of FIG. 3, operations CONV[4,1], CONV[4,2], CONV[4,3], ACTIVATE[4], and POOL[4] in the fifth column in FIG. 3 may also use bank [0] in output buffer 226 of accelerator 202. Thus, even if there is no data dependency between operation POOL[0] and operation CONV[4,1], there may be a resource dependency between operation POOL[0] and operation CONV[4,1].

As shown in FIG. 3, to enforce the data or resource dependency, an event indicator event[0] may be set when the execution of operation CONV[0] by the PE array is complete, and the activation engine may wait for event[0] before starting to execute operation ACTIVATE[0]. Similarly, an event indicator may be set after the execution of each operation in column 1 is complete, and each subsequent operation may be started after the event indicator has been set, which may indicate the operation associated with event may have been completed. In addition, the PE array may wait for an event indicator (e.g., event[3]) set after the operation POOL[0] by the pooling engine is complete, before starting to execute convolution operation CONV[4, 1], in order to avoid corrupting data in bank[0] that may be used or generated by the pooling engine when executing operation POOL[0].

Figure 4:
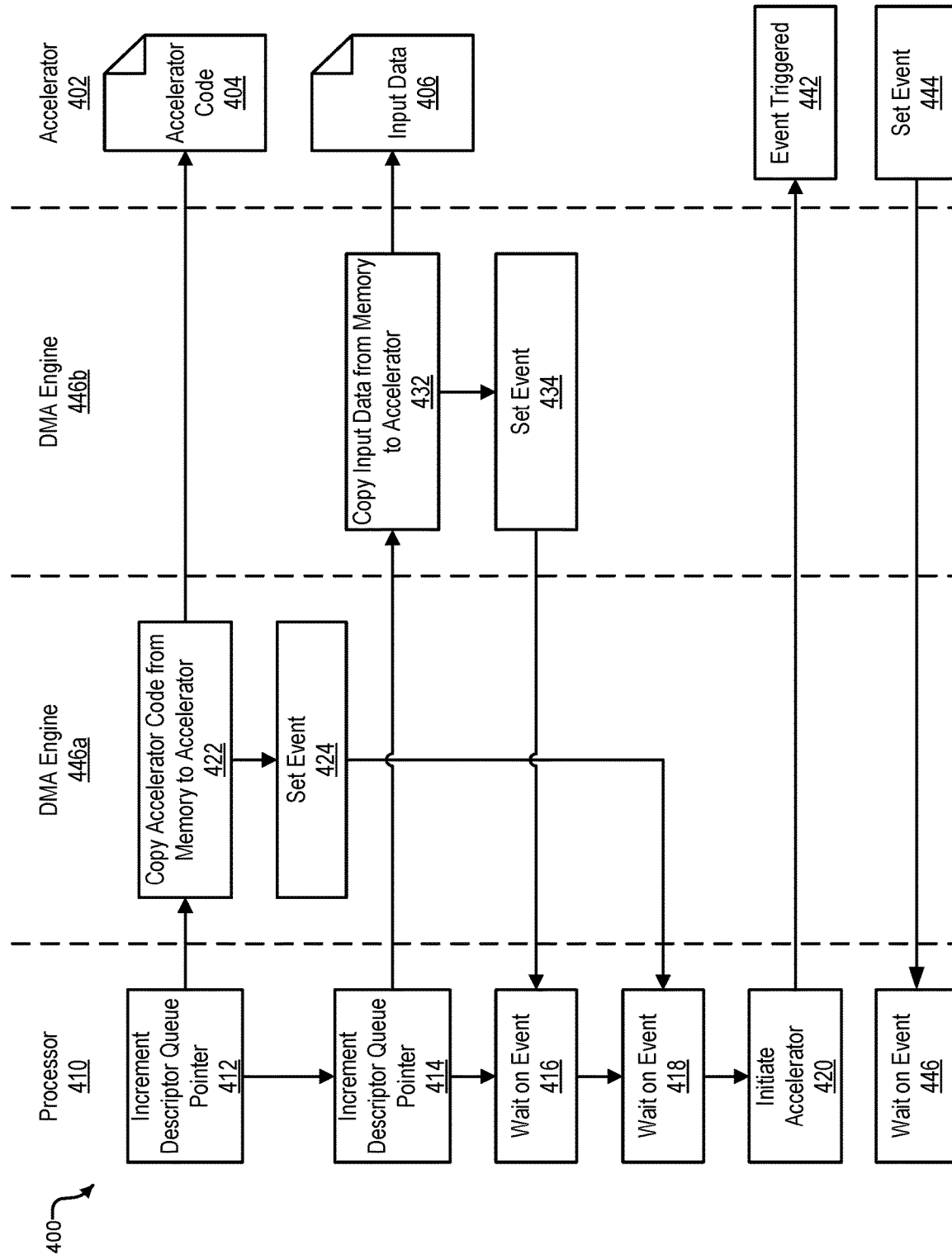
FIG. 4 includes a flow diagram illustrating an example of program code for a data management processor according to certain embodiments.

FIG. 4 includes a flow diagram illustrating an example of program code 400 for a processor 410 (such as a data management processor), and the actions triggered when the data management processor executes the instructions in the program code. Program code 400 of this example sets up an accelerator 402 to perform a computation on a set of input data 406. The computation can be, for example, execution of a neural network, rendering of graphics, or floating point calculations, among other computations. As discussed above, processor 410 can begin executing the program code when processor 410 finds that a head pointer for the processor's instruction memory is not pointing to a same address as the address pointed to by the tail pointer.

Step 412 illustrates a first instruction, in which processor 410 increments a descriptor queue pointer for a first DMA engine 446a. Descriptors may have been added to the first DMA engine's descriptor queue in advance, for example by a driver program, as discussed above. To increment the descriptor queue pointer, processor 410 can, for example, write a command to first DMA engine 446a that instructs first DMA engine 446a to increment a pointer for the first DMA engine's descriptor queue by a certain number of entries. In various examples, processor 410 does not wait for nor expect a reply to this command, and instead moves on to the next instruction.

In the meantime, first DMA engine 446*a* may, at step 422, execute a descriptor in the descriptor queue of first DMA engine 446*a*. In this example, executing the descriptor causes first DMA engine 446*a* to copy accelerator code 404 from a memory location where accelerator code 404 is stored to memory location in accelerator 402. In various examples, accelerator code 404 provides instructions, and possibly also data, that accelerator 402 can use to perform a computation or a series of computations. In some examples, the copy operation of step 422 can involve two memory descriptors, a first that informs first DMA engine 446*a* where to read accelerator code 404 and a second that informs first DMA engine 446*a* where to write accelerator code 404. In these examples, the instruction at step 412 can include incrementing the descriptor queue pointer by two entries. The increment value first DMA engine 446*a* receives from the instruction at step 412 can act as a counter, and first DMA engine 446*a* can execute a descriptor for each count until the number of descriptors executed equals the count.

In various examples, the descriptor queue of first DMA engine 446*a* can also include, at step 424, a descriptor that causes first DMA engine 446*a* to set an event register in processor 410. In various examples, step 424 is not executed until the copying of accelerator code 404 at step 422 completes. Setting the event indicator, at step 424, thus can inform processor 410 that copying of accelerator code 404 has completed. An event indicator can be represented in processor 410 by a register or memory address to which other components, such as DMA engines and accelerators, can write. At step 424, for example, first DMA engine 446*a* can execute a descriptor that includes a write to the register or memory location of a particular event indicator. Events are discussed further below.

At step 414, processor 410 executes a second instruction, which causes processor 410 to increment the descriptor queue pointer for a second DMA engine 446*b*. To increment the descriptor queue pointer for second DMA engine 446*b*, processor 410 can, for example, send a command to second DMA engine 446*b* that instructs second DMA engine 446*b* to increment a descriptor queue pointer by a certain number of entries. In various examples, processor 410 does not expect or wait for a response to this command, and instead proceeds to the next instruction.

At step 432, having been instructed to execute a number of descriptors, second DMA engine 446*b* can sequentially execute the descriptors. In the example of FIG. 4, the descriptors cause second DMA engine 446*b* to copy input data 406 from a memory location where input data 406 is stored to memory in accelerator 402. Input data 406 can be data on which accelerator 402 performs the computation programmed by accelerator code 404, and for which a result is desired. In some examples, copying input data 406 involves two descriptors, one descriptor that causes second DMA engine 446*b* to read input data 406 from the storage location and a second that causes second DMA engine 446*b* to write input data 406 to accelerator 402.

In various examples, after executing the copy operation at step 432, second DMA engine 446*b*, at step 434, sets an event indicator in processor 410. Setting the event indicator can include, for example, transmitting a write transaction, with a particular address, to processor 410. In various examples, second DMA engine 446*b* executes step 434 only after the copy operation of step 432 completes, so that the event indicator informs processor 410 that copying of input data 406 has finished. In some examples, the write transaction can be initiated by a descriptor in the descriptor queue of second DMA engine 446*b* that processor 410 instructs second DMA engine 446*b* to execute.

As noted above, processor 410 can execute the instructions at steps 412 and 414 without waiting for a reply or acknowledgment from either first DMA engine 446*a* or second DMA engine 446*b*. Processor 410 can thus proceed to step 416, at which processor 410 decodes and executes an instruction to wait for an event. Waiting on an event can include, for example, monitoring a particular register or memory location for a write to the register or memory location. In some examples, processor 410 can have a number of registers or address locations that each represent a different event. In these examples, each register or memory location can represent a different event. In some examples, for an event to occur, a particular value must be written to the register or memory location. The value can represent, for example, an identity of the event indicator that is being set. Alternatively or additionally, a value of "1" can indicate that the event indicator has been set, while a value of "0" indicates that the event indicator has not been set. Alternatively or additionally, in some examples, any value can be written to the register or memory location to indicate that the event has occurred.

In the example of FIG. 4, processor 410 waits, at step 416, for a first event to occur. In this example, the first event indicator is set by second DMA engine 446*b*, and setting of the event indicator by second DMA engine 446*b* may occur some time after processor 410 reaches the instruction at step 416. Processor 410 may thus wait and execute no further instructions until receiving an indication that the first event indicator is being set. Upon receiving this indication, processor 410 can proceed to step 418.

At step 418, processor 410 decodes and executes an instruction to wait on a second event. In various examples, processor 410 can distinguish the second event from the first event from an identifier associated with the events, an address for each event, or some other encoding for the events. In the example of FIG. 4, the second event indicator is set by first DMA engine 446*a*. Setting of the second event indicator by first DMA engine 446*a* may have occurred before setting of the first event indicator by second DMA engine 446*b*. For example, first DMA engine 446*a* may have had a smaller amount of data to move than did second DMA engine 446*b*. In this and other examples, when processor 410 encounters the instruction to wait on the second event, processor 410 may find the event indicator already set, and may thus proceed to the next instruction.

The order in FIG. 4 of steps 416 and 418 is provided as an example. In other examples, these steps can be reversed, with the same outcome (e.g., processor 410 waits for the copy operations of both step 422 and step 432 to complete before proceeding) occurring.

At step 420, processor 410 may next decode and execute an instruction to initiate accelerator 402. This instruction can, for example, cause processor 410 to send a write transaction to accelerator 402, which sets an event indicator at accelerator 402. Events at accelerator 402 can operate in a similar fashion as events in processor 410, in that accelerator 402 may be able to watch particular registers or memory addresses for values to be written to these registers or memory locations. In the example of FIG. 4, accelerator 402 can thus, at step 442, see that an activation event has been triggered, which can cause accelerator 402 to begin executing accelerator code 404.

In various examples, program code 400 can include additional steps that are similar to the steps illustrated in FIG. 4. For example, accelerator code 404 may include stages, such that program code 400 includes instructions to successively load each stage into accelerator 402. These instructions can take the form of additional instructions to increment descriptor queues.

In various examples, program code 400 can also include instructions for copying a result computed by accelerator 402 to a memory location, such as in the host memory. In these examples, program code 400 can include instructions to increment additional descriptor queue pointers, which cause a DMA engine to read data from accelerator 402 and write the data into a memory location.

In the example of FIG. 4, program code 400 makes use of two DMA engines and one accelerator. In other examples, program code can make use of one DMA engine and one accelerator, one DMA engine and multiple accelerators, or multiple DMA engines and multiple accelerators. In each of these cases, the number and identity of the DMA engines and the accelerators is encoded in the instructions of the program code.

As described above, a neural network may include multiple processing engines and each processing engine may run independently in multiple threads to perform millions or billions of arithmetic operations that may have data or resource dependency. In many cases, the software (e.g., instructions) and hardware of the initially implemented neural network may not be optimized and thus the performance (e.g., speed) of the neural network may not be as high as desired. Because of the large circuitry, the large amount of computation performed by the neural network, and the parallel execution of different operations by different processing engines, it may be difficult to accurately identify the software instructions or hardware circuits that may be the bottlenecks of the neural network or may cause the lower than desired performance of the neural network.

According to certain embodiments, event notification messages indicating the set time and the clear time of various events used for synchronizing the transportation of data and/or instruction to various circuits and the execution of the various circuits in a computing system may be generated automatically when the event indicators are set and cleared. No explicit instructions is used to generate and save these event notification messages. Thus, the performance of the circuits of the computing system may not be negatively affected. The event notification messages generated by the various circuits may be saved to a memory device and may be read back later for analysis. For example, based on the correlations between the user commands, compiled instructions and operations, and the start time and clear time of each event, actual execution time, latency, and/or bandwidth usage for individual user commands and instructions or operations by the circuits may be determined. As such, possible bottlenecks of the computing system, such as operations or user commands for the network that may take a long time to perform before other operations can be performed, may be identified. The computing system may then be improved by, for example, modifying the hardware resources, assigning operations to different functional blocks, modifying the network model, and the like.

Figure 5:
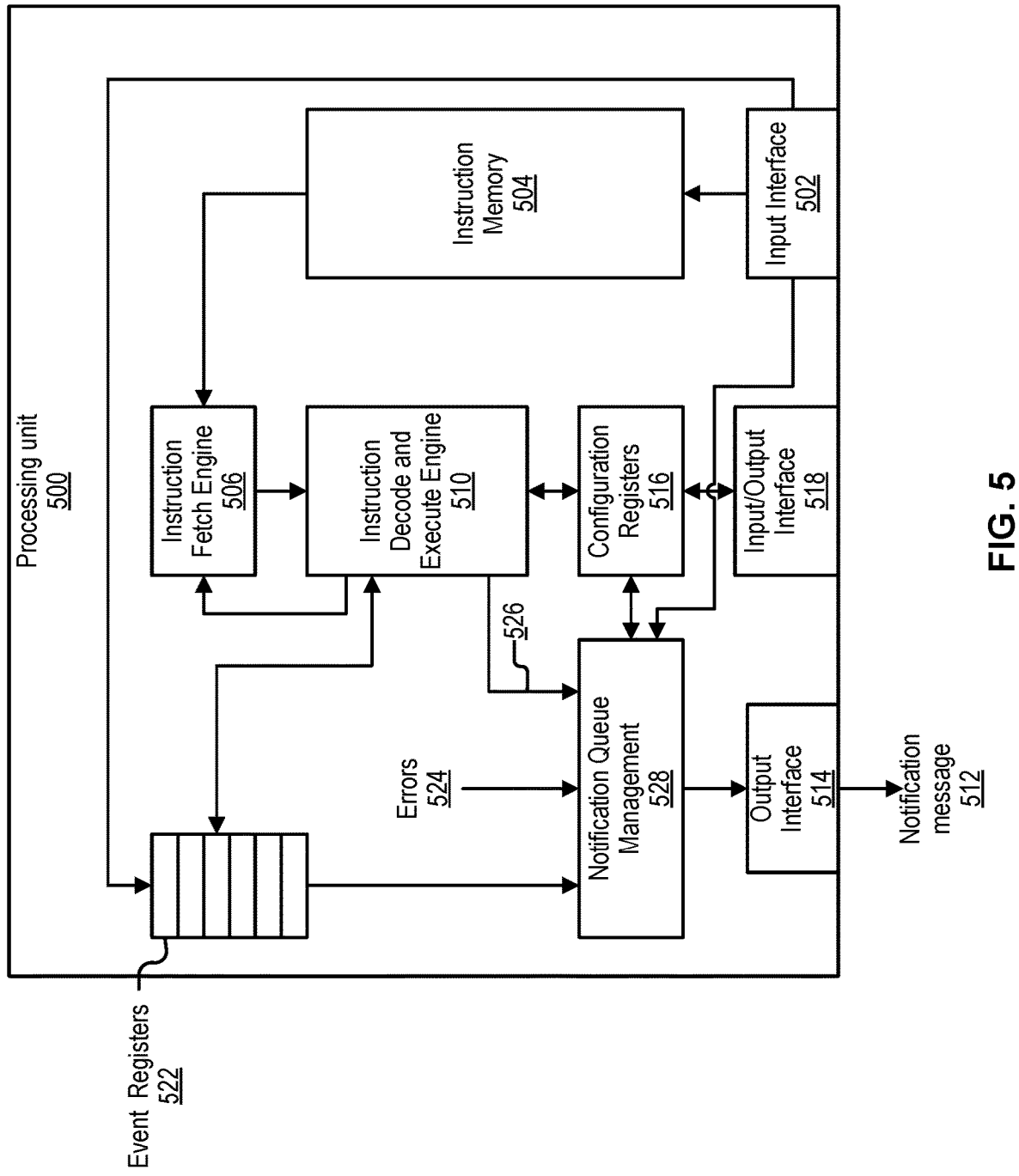
FIG. 5 is a block diagram illustrating an example of a processing unit configured to generate notification messages according to certain embodiments.

FIG. 5 is a block diagram illustrating an example of a processing unit 500 configured to generate notification messages according to certain embodiments. Processing unit 500 may be any one of a support system (e.g., support system 112 or coordination processor 230) or an accelerator (e.g., accelerator 202 or a processing engine in accelerator 202). Processing unit 500 is an example of an integrated circuit device that can execute program instructions, and can also be referred to as a processor. In various examples, processing unit 500 can be implemented using an integrated circuit device, such as an Application Specific Integrated Circuit (ASIC), a Field Programmable Gate Array (FPGA) or a similar integrated circuit device. In some examples, processing unit 500 can be incorporated into a larger integrated circuit device. For example, processing unit 500 can be a component in a System on a Chip (SoC).

In the example illustrated in FIG. 5, processing unit 500 includes an input interface 502, an instruction memory 504, an instruction fetch engine 506, an instruction decode and execute engine 510, event registers 522, a notification queue management 528 component, and an output interface 514. Processing unit 500 further includes configuration registers 516 and a combined input/output interface 518 that can provide an alternative interface for exchanging data with other components in the computing system. In various examples, each of the blocks illustrated in the example of FIG. 5 can include a portion of the overall integrated circuitry of processing unit 500.

In various examples, input interface 502 may provide processing unit 500 with the ability to receive data from other components in the computing system. The data can include program code and other data. For example, a driver program that controls the operation of processing unit 500 can cause program code to be written to processing unit 500, which is received at input interface 502. As a further example, the driver program can also issue a write transaction to update a header pointer for a queue managed by notification queue management 528, and this write transaction can be received at input interface 502. Input interface 502 can be implemented, for example, as an Advanced Extensible Interface (AXI) slave interface, for when the computing system's communication fabric includes an AXI bus structure. In various examples, other bus structures and bus protocols can be used.

In various examples, instruction memory 504 can provide processing unit 500 with local storage for program code. Instruction memory 504 can be managed by instruction fetch engine 506, which can keep track of free space in instruction memory 504, space that is storing not-yet-executed instructions, and space that is storing instructions that processing unit 500 has already executed. Instruction fetch engine 506 can further keep track of the next instruction that is to be executed, and can fetch this instruction when the instruction decode and execute engine 510 is ready for another instructions, or possibly in advance of the instruction decode and execute engine 510 being ready.

As an example, instruction memory 504 can be 64 kilobytes (KB) in size, and be logically organized with 32-bit words (e.g., each addressable location stores 32 bits). In some examples, instruction memory 504 can be protected using Single-Error Correcting and Double-Error Detecting (SECDED) Error Correcting Code (ECC). In some examples, read and write transfers have lengths in multiples of four bytes, and are 4-byte aligned, or else transactions do not complete and processing unit 500 responds at input interface 502 with an error.

In various examples, the instruction decode and execute engine 510 decodes instructions read from instruction memory 504 and executes the instructions. The instructions can, for example, cause the instruction decode and execute engine 510 to initiate the movement of data from one location in the computing system to another (e.g., from a memory to another device in the system), wait on a timer, wait on an event, write a notification to a memory location, or trigger an interrupt, among other operations.

An operation that the instruction decode and execute engine 510 can perform is waiting on an event or checking whether an event has happened. As described above, an event may be an indicator of an execution status of an operation associated with one or more instructions. For example, an event may be a flag that can be set or cleared to indicate whether an operation is being performed or has been completed. An event may be indicated by the changing of the status of a register in event registers 522. Thus, waiting on an event may involve watching a register associated with the event for a change. The change can be, for example, the setting of a value in the register, or the clearing (e.g., writing to zero) of the register. While waiting for the event to occur, processing unit 500 may stall and stop executing instructions. Otherwise, when the instruction decode and execute engine 510 decodes a wait-for-event instruction and finds the event has already occurred (e.g., a particular value is already present in the event register), then processing unit 500 may proceed to the next instruction. In various examples, events or event indicators may be set or cleared by components external to processing unit 500, such as other integrated circuit devices in the computing system. Thus, events can be used to synchronize the activity of processing unit 500 with the activity of the other components in the system. In various examples, processing unit 500 can include multiple event registers, each of which may indicate the occurrence of a different event.

In various examples, a change in the status of one of event registers 522 can cause processing unit 500 to send a notification message 512. For example, when the event indicator register is set, notification queue management 528 can determine to send a notification message 512 that identifies the register and indicates that the register was set. In various examples, notification queue management 528 can also send a notification message 512 when the event register is cleared. In some examples, notification queue management 528 can also generate a notification message 512 when an event indicator is set twice or cleared twice. In these examples, notification message 512 can indicate that the event indicator was set or cleared twice, which might be erroneous behavior, and thus should be identified. In these and other examples, notification message 512 can provide information about when synchronization events occurred and/or when processing unit 500 encountered a synchronization event.

In various examples, the feature of the notification queue management 528 generating a notification message 512 upon a change in the status of an event register can be enabled or disabled. For example, configuration registers 516 can include a register for each event that indicates whether a change to the register for the event should cause a notification message 512 to be generated.

In various examples, notifications for different event registers can be written to the same queue in processor memory or in different queues. For example, configuration registers 516 can include one set of registers (e.g., for information such as a base address, a head pointer, and a tail pointer) for one queue in the processor memory, can include a set of registers for each of the events, or can include a set of registers for sets of events, such as groups of eight or more events. In various examples, the number of queues used can be configured by the driver program that controls processing unit 500.

In various examples, when notification queue management 528 determines that the queue to which an event notification is to be written may be full when the notification is added to the queue, notification queue management 528 can set a bit or field in the notification that indicates that the queue reached a full state. This indication can notify the software that reads the queue that additional notifications that may have been written to the queue have instead been discarded or dropped. In these and other examples, the full state of the queue does not interfere with the execution of instructions by processing unit 500. In various examples, notification queue management 528 may stop generating event notifications that are to go to a full queue until receiving an indication (e.g., by way of an update to the head pointer for the queue) that the queue has space for additional notifications.

Other conditions, such as errors or interruptions, may be detected and a notification message may be sent for each such condition. In some cases, the detected condition may be non-fatal and can be used to provide information related to the internal operation of processing unit 500, which can be used by a host processor (e.g., host processor 104) to analyze performance, debug, or reconfigure certain features of processing unit 500. For example, a forward branch error or a backward branch error may inform the host processor of the operational flow of the processing unit 500. In another example, a correctable ECC error or a non-correctable ECC error may be used by the host processor to monitor the performance of the memory. For example, the host processor can track occurrences of the ECC conditions over a period of time to determine that a certain portion or all of the memory is starting to fail so that the memory can be reconfigured or replaced.

In various examples, a notification message 512 can also be generated when processing unit 500 encounters an error 524. Errors 524 can occur due to a problem in the operation of the hardware of processing unit 500, due to misconfiguration of processing unit 500, because of problems in the program code, and/or due to processing unit 500 receiving problematic instructions from other components in the computing system, among other examples. Errors 524 can be detected, for example, by instruction decode and execute engine 510, such as when instruction decode and execute engine 510 encounters an instruction that cannot be decoded or that contains invalid fields, among other examples. Errors 524 can, alternatively or additionally, be detected by instruction fetch engine 506, for example when instruction fetch engine 506 receives an improperly formatted write transaction for instruction memory 504. Errors 524 can also, alternatively or additionally, be detected by notification queue management 528, such as when a notification queue becomes full or notification queue management 528 is told to generate a notification for which no queue has been configured, among other examples.

In some embodiments, notification queue management 528 may also generate a notification message 512 upon the instruction decode and execute engine 510 decoding an explicit instruction for generating a notification. This type of notification is referred to herein as an explicit notification 526. The notification instruction can enable program code to output notifications at any point during the execution of the program code. The notification instruction can, thus, be used to indicate that a certain set of instructions have been executed or a count of iterations of a loop in the code, among other examples. The explicit notification 526 can provide similar information as a print statement in the program code, without the overhead of having to conduct I/O operations.

In some examples, the generation of explicit notifications 526 can also be enabled or disabled through registers in configuration registers 516. For example, configuration registers 516 can include a register that, if set, disables or enables all explicit notifications 526. As another example, configuration registers 516 can include one or more registers that can identify explicit notifications 526 that are enabled or disabled. The explicit notification 526 can be identified, for example, by a token or counter identifier indicated by the instruction that triggers generation of the notification.

In various examples, explicit notifications 526 can be written to the same queue in the processor memory or to different queues. For example, configuration registers 516 can include one or multiple sets of registers, where each set of registers is associated with a queue in the processor memory. In this example, each set of registers can store information such as the base address, head pointer, and tail pointer for each queue. In some examples, the driver program may configured a limited set of queues for the explicit notifications 526, such as four, eight, sixteen, or another number of queues. In these examples, a token identifier, counter, identifier or other information included in a notification instruction can designate to which queue notification message 512 should be written.

In addition to generating notifications, notification queue management 528 can perform other management operations for the notifications. For example, notification queue management 528 can include a timestamp generator, from which each notification can obtain a timestamp. In this and other examples, the notifications can each obtain a timestamp from the same source (such as a clock counter), so that the notifications can be correlated to one another based on the timestamps. Additionally, for example, when multiple errors occur concurrently (e.g., in the same clock cycle), or errors occur concurrently with a change of status of an event indicator or an explicit notification 526, or notification queue management 528 otherwise receives simultaneous requests to generate notifications, notification queue management 528 can apply the same timestamp to each notification generated. That is, notification queue management 528 need not queue simultaneous notification requests, and can instead handle each request at the same time (e.g., within the same clock cycle). By applying the same timestamp to concurrently occurring notifications, the notifications can indicate different things that occurred in processing unit 500 at the same time.

In various examples, when a computing system includes more than one accelerator, timestamp generators in the multiple accelerators can be synchronized, for example by being started on the same value (e.g., at zero) at the same time. For example, the accelerators can be made to exit reset in the same clock cycle, or may wait for an explicit signal before starting the timestamp generators. In some examples, the accelerators may further periodically by synchronized, for example by receiving an updated value for the timestamp, from which each accelerator can subsequently start counting.

Notification queue management 528 can further keep track of the notification queues in the processor memory (and/or another external memory). For example, configuration registers 516 can include registers that store information such as a base address and size for each queue, as well as the current head pointer location and tail pointer location for each queue. In this example, notification queue management 528 can update the tail pointer of a queue upon sending a notification message 512 to the queue. Notification queue management 528 can, for example, cause a transaction to be sent, either through output interface 514 or the combined input/output interface 518, that indicates the update to the tail pointer. As another example, notification queue management 528 can check whether queues are full by examining the head and tail pointers of the queues.

In various examples, notification queue management 528 can further include a physical queue for storing outgoing notifications. A hardware queue can enable notification queue management 528 to store notifications that are generated concurrently (e.g., in the same clock cycle), for example. The hardware queue can also enable notification queue management 528 to store notifications when output interface 514 is busy being used to output other data. In these and other examples, additional errors that notification queue management 528 can detect include the hardware queue being full when notification queue management 528 has more notifications to generate.

In various examples, output interface 514 provides processing unit 500 with an interface through which processing unit 500 can output data to other components in the computing system. Output interface 514 can, for example, connect to a communication fabric in the computing system. Output interface 514 can be implemented, for example, as an AXI master interface, for connecting to an AXI bus structure. In various examples, other bus structures and bus protocols can be used.

In addition to storing information for the notification queues, in various examples, configuration registers 516 enable certain operations of processing unit 500 to be modified when processing unit 500 is in operation, and/or can provide a place from which information about processing unit 500 can be read. For example, configuration registers 516 can include registers for enabling or disabling interrupts that can be generated from processing unit 500. Configuration registers 516 can further include, for example, registers from which a current execution state, current timestamp, statistics, or other data can be read.

In various examples, configuration registers 516 can be read from and written to through a combined input/output interface 518. The combined input/output interface 518 can provide processing unit 500 with an alternate communication path to other components in the system. This path can be slower than the paths used by input interface 502 and output interface 514, or may provide a more direct connection to the primary processor. In some examples, the combined input/output interface 518 is optional, and processing unit 500 receives transactions for configuration registers 516 at input interface 502, and sends data form configuration registers 516 out through output interface 514.

In some embodiments, multiple processing units in a computing system may each include a notification queue management block, such as notification queue management 528, and even registers (such as event registers 522). The notification queue management blocks in the processing units may generate notification messages based on a same clock source or clock counter and send the notification messages to the same queue in a host memory, such as host memory 106. The even registers may be set or cleared internally or externally by other circuits or processing units.

Figure 6:
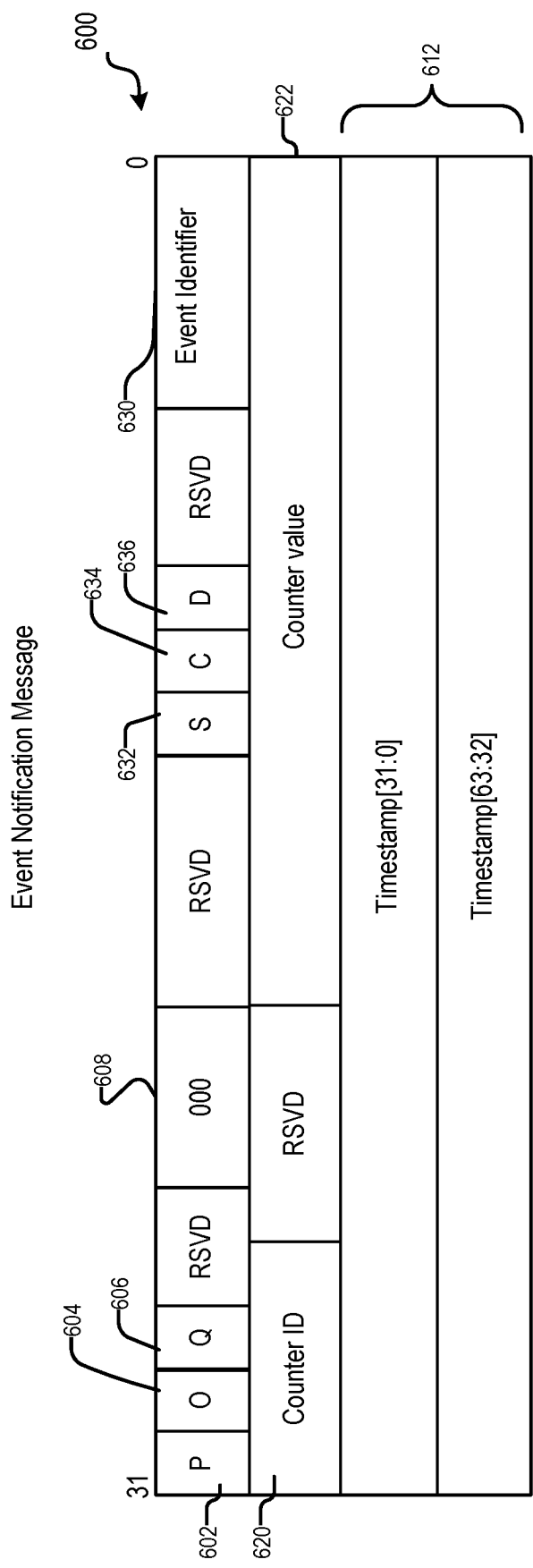
FIG. 6 illustrates an example for an event notification message according to certain embodiments.

FIG. 6 includes an example of an event notification message 600 according to certain embodiments. As discussed above, an event notification message can be generated when the status of a register associated with an event changes. Status changes can include, for example, writing to the register to indicate that the event has occurred or clearing (e.g., writing to zero) the register so that the register is ready for the next occurrence of the event.

In the example shown in FIG. 6, event notification message 600 is 32-bit wide and may include a total of 128 bits.

In other examples, an event notification message can include more or fewer bits. In the illustrated example, event notification message 600 may include a phase bit 602, a hardware queue overflow bit 604, and a software queue overflow bit 606. Phase bit 602 can be used by software to see whether a queue has a new notification. For example, software such as a driver program can periodically check a queue entry indicated by the head pointer to see if the phase bit in the entry is set to the current phase value. In this example, when the software finds the previous phase value, the software knows that the entry is storing an old notification, and when the software finds the current phase value, the software knows the entry is storing a new notification. Hardware queue overflow bit 604 may indicate that a hardware queue is full and additional notifications could not be added to the queue. The hardware queue can be, for example, a queue in an accelerator, which the accelerator uses to store notifications until the notifications can be sent from the accelerator. Hardware queue overflow bit 604 can be set, for example, in the last notification that the hardware queue can accept before becoming full. Software queue overflow bit 606 can indicate that a queue in the processor memory has become full, and that some notifications for the queue may have been lost. Software queue overflow bit 606 can be set, for example, in the last notification that the queue can accept before becoming full.

In the example shown in FIG. 6, event notification message 600 may include a type field 608. In this example, the value "000" in type field 608 is used to indicate that the notification provides information about an event. Some bits may be reserved or may not be used.

Event notification message 600 may also include a set bit 632, a clear bit 634, and a double bit 636. Set bit 632 can indicate whether the register for the event was set, while clear bit 634 can indicate whether the register was cleared. In this example, separate set and clear bits enables a notification to indicate that the event register was both set and cleared in the same clock cycle. Double bit 636 may indicate that a set or a clear happened more than once. While setting or clearing an event register may have been deliberate, sometimes setting or clearing the register more than once may have been a mistake. Thus, when an event register is set or cleared more than once in a row, a notification can be generated with double bit 636 set.

Event notification message 600 may further include an event identifier 630, a counter identifier 620, and a counter value 622. Event identifier 630, in this example, is an 8-bit value that can be used to identify different events. As discussed above, an accelerator may have as many as 256 event registers, as an example. Event identifier 630 can thus identify which of the event registers underwent a change of status. Counter identifier 620 can be used to identify one of multiple counters that can be maintained by an accelerator, and counter value 622 can include the value of the counter at the time the notification is generated. In the illustrated example, counter identifier 620 includes four bits in order to identify up to sixteen counters. In various examples, a counter is a register that is incremented or decremented by program instructions. Counters can be used by program code that executes on the accelerator for various purposes. For example, the program code can use a counter to count a number of iterations of a loop in the code, or the number of times a certain instruction or set of instructions occurs. In some examples, the accelerator does not modify a counter other than at the direction of instructions in the program code (e.g., instructions for setting a value in the counter, incrementing the counter, or decrementing the counter, among others).

Timestamp 612 in event notification message 600 can include a value obtained from a timestamp generator that is part of the notification mechanism. In various examples, all notifications receive a timestamp from the same generator. Additionally, notifications that are triggered in the same clock cycle can receive the same timestamp. The timestamp can thus be used to relate one notification to another.

Figure 7:
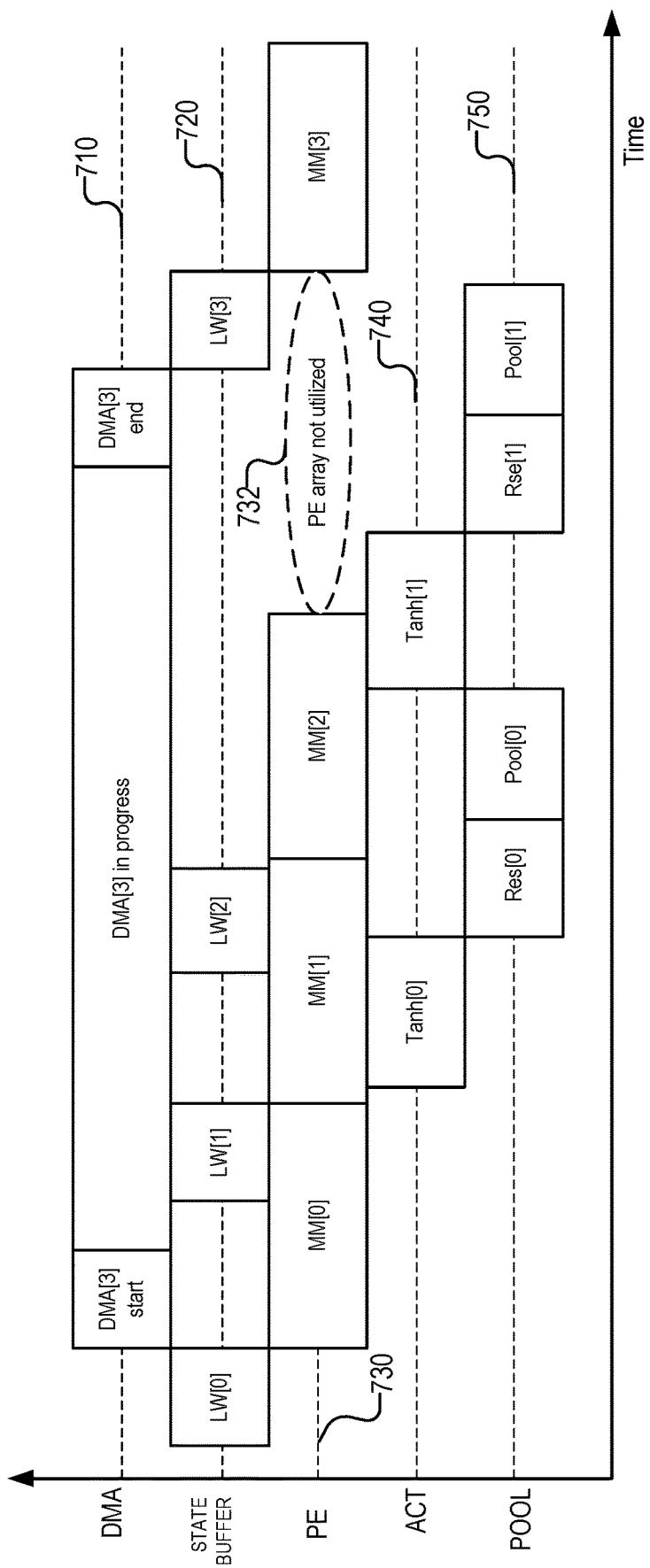
FIG. 7 illustrates examples of execution timelines of various functional blocks of a neural network generated based on some techniques disclosed herein according to certain embodiments.

FIG. 7 illustrates examples of execution timelines of various functional blocks of a neural network generated based on some techniques disclosed herein according to certain embodiments. The timelines may be generated based on the timestamps associated with the operations performed by the functional blocks of the neural network. For example, the operations of a DMA controller of the neural network may be shown by a timeline 710, which may indicate the DMA start time (e.g., start time of DMA[3]), the data transfer time (e.g., data transfer time of DMA[3]), and the DMA finish time (e.g., end time of DMA[3]). The loading of the weights for the neural network layers to a state buffer may be shown by a timeline 720, which indicates the starting time and the end time for loading the weights for the network layers, such as an operation LW[0] for loading the weights for a set of a convolution layer, an activation layer, and/or a pooling layer. The operations of a PE array may be shown by a timeline 730, which may indicate the starting time and the end time of each convolution operation, such as matrix multiplication MM[0], MM[1], MM[2], or MM[3]. The operations of an activation engine may be shown by a timeline 740, which may indicate the starting time and the end time of each activation operation, such as activation operation Tan h[0] or Tan h[1]. The operations of an pooling engine may be shown by a timeline 750, which may indicate the starting time and the end time of each residual operation, such as activation operation Tan h[0] or Tan h[1], and the starting time and the end time of each pooling operation, such as pooling operation Pool[0] or Pool[1]. The timelines may be aligned based on a common reference clock. Based on the timelines, the utilization rate of the functional blocks of the neural network during the operation of the neural network and the bottlenecks of the neural network may be determined. For example, during a time period 732, the PE array may not be utilized.

Figure 8:
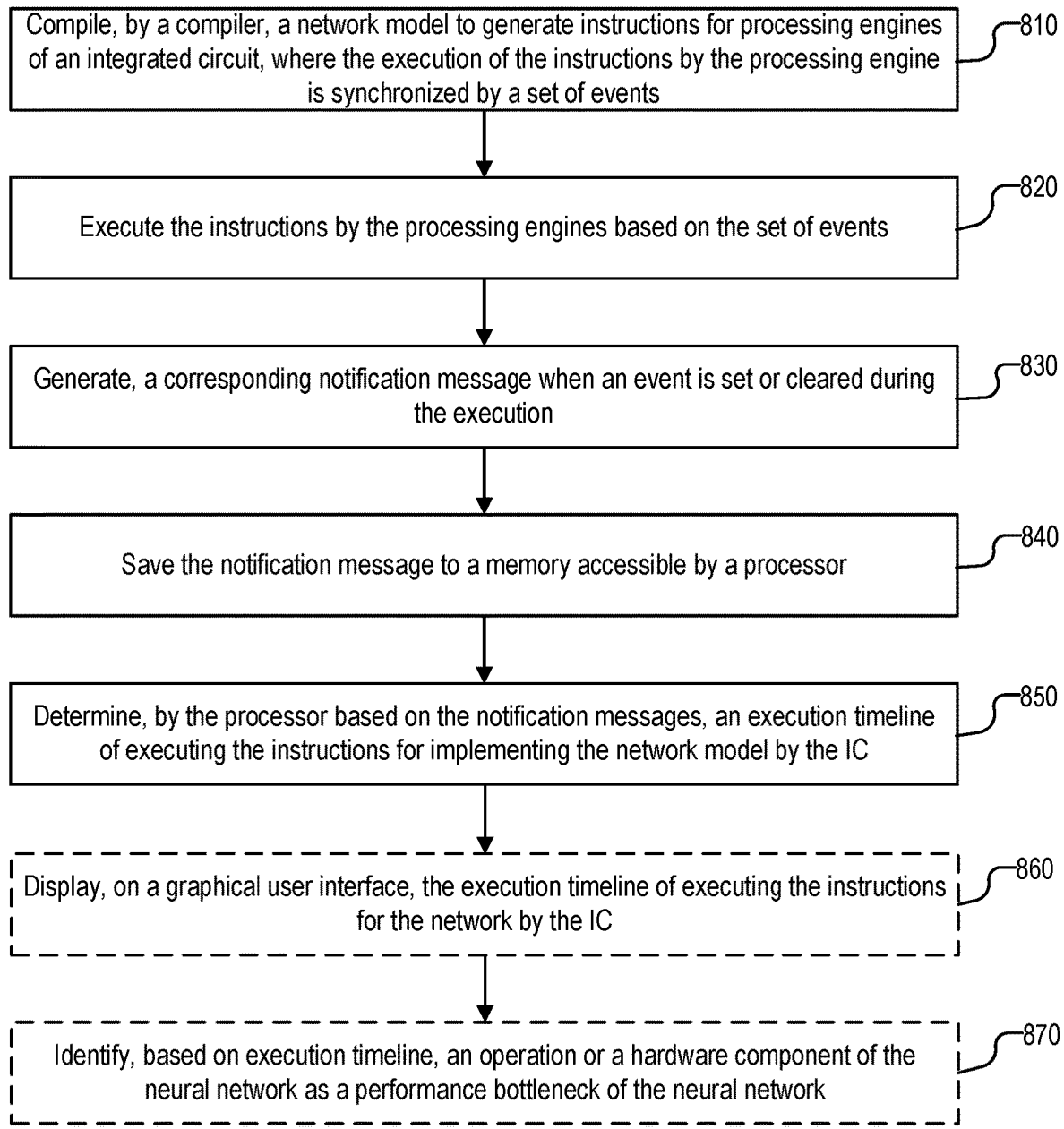
FIG. 8 is a simplified flow chart illustrating an example method for analyzing the performance of a neural network according to certain embodiments.

FIG. 8 is a simplified flow chart 800 illustrating an example method for analyzing the performance of a neural network according to certain embodiments. The method may be implemented by the systems described above with respect to, for example, FIGS. 1, 2, and 5. Even though FIG. 8 describes the example methods as sequential operations, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

At block 810, a compiler may compile a network model to generate instructions for processing engines of an integrated circuit, where the execution of the instructions by the processing engine may be synchronized by a set of events. The processing engines may include, for example, a convolution engine, an activation engine, a pooling engine, or a DMA engine. In some embodiments, the processing engines of the neural network may execute respective sets of instructions in multiple threads as described above. The compiling may include, for example, determining the processing engine used to perform an operation (e.g., convolution, polling, activation, multiplication, etc.), determining memory locations for storing various data for the neural network (e.g., input data to the neural network and parameters of the neural network, such as weights or filters parameters), determining the order of operations by different processing engines, determining the relative timing of the operations, and determining events to be used to enforce the relative timing or the order of the operations by the different processing engines. For example, in some embodiments, instructions for clearing event when an operation is triggered or instructions for setting events after the completion of an operation, and/or instructions to wait for an event before starting an instruction, and the like, may be added by the compiler to enforce the order of operation when needed. The executable instructions may be stored in a memory device and may be read by the various processing engines into corresponding instruction buffers for executing by the processing engines.

At block 820, the processing engines may execute the instructions based on the set of events. Each processing engine may be configured to execute a subset of the executable instructions. In some embodiments, the processing engines may be coordinated based on events as described above with respect to, for example, FIGS. 2-5. For example, an activation engine may be controlled to wait for an event indicating the completion of an instruction by a convolution engine to be set before starting an activation operation that uses the output of the convolution engine.

At block 830, a corresponding notification message may be generated when an event indicator is set or cleared during the execution. The notification message may include an identification of the event and a timestamp associated with the event as described above with respect to, for example, FIG. 6. As also described above, during execution of instructions by the integrated circuit, an internal status of the integrated circuit may be monitored. The internal status can describe a current operational state of hardware of the integrated circuit. For example, the integrated circuit may determine that a change of status of a register associated with an event has occurred. In this example, determining to generate the notification message is based on the change of status, and the internal status included in the notification message indicates the change of status. The change of status may be that a particular value has been set in the register or that values have been cleared from the register (e.g., written to zero or otherwise invalidated). The integrated circuit may be monitoring the register for the change of status. The status may be changed by a write transaction received by the integrated circuit from external to the integrated circuit, such as from another integrated circuit device that is able to communicate with the integrated circuit. Alternatively or additionally, the change of status may have been caused by the integrated circuit device itself. For example, the integrated circuit device may have cleared the register. In various examples, the method may further include determining whether generation of the notification message for the event is enabled or disabled, for example by reading a configuration register in the integrated circuit. In some examples, the integrated circuit includes a plurality of registers associated with a plurality of events. In these examples, the notification message can include an identifier that identifies the event.

In some embodiments, the current operational state of the hardware can include the occurrence of an error, a halt, or an interrupt. For example, the integrated circuit can determine that an error in an operation of the integrated circuit has occurred. In this example, determining to generate the notification message is based on the error having occurred, and the internal status included in the notification message can indicate or identify the error. In some examples, the method may further include determining whether generation of the notification message for the error is enabled or disabled, for example by reading a configuration register that stores this information.

In some embodiments, the internal status can describe a current operational state of the execution of the instructions. For example, the integrated circuit device may decode an instruction for generating a notification message. That is, the instruction set for the integrated circuit device can include an instruction that explicitly requests that a notification message be output. In this example, the internal status included in the notification message indicates information provided by the instruction. Such information can include, for example, a token (e.g., a number or value) and/or a counter identifier and counter value, among other examples.

At block 840, the notification message may be saved to a memory accessible by a processor. For example, a write transaction for saving the notification message may be triggered by, for example, notification queue management 528, where the write transaction may be addressed to a queue in a processor memory. In some examples, the method can further include selecting the queue from a plurality of queues in the processor memory. In these examples the queue can selected based on the type included in the notification. Alternatively or additionally, the queue can be selected using a configuration register that can designate the queue to use.

At block 850, the processor may read the notification messages saved in the memory, and determine, based on the notification messages, an execution timeline of executing the instructions for implementing the network model by the integrated circuit. For example, based on the time each event indicator is cleared or set, the starting or ending time of each operation performed by the corresponding processing engine may be determined, and timelines may be generated for the processing engines or the whole neural network. The timelines may be generated and aligned based on a global reference clock (or a clock counter). The timelines may indicate an execution time, a latency, and/or a bus bandwidth usage for an operation associated with an event. In some embodiments, the execution timeline may indicate a time difference between a time when a first event indicator is set and a time when a second event indicator is set, a time difference between a time when the first event indicator is cleared and a time when the second event indicator is cleared, a time difference between the time when the first event indicator is cleared and the time when the second event indicator is set, or a time difference between the time when the first event indicator is cleared and the time when the first event indicator is set. In some embodiments, statistics regarding the various events may be determined. The statistics may include, for example, the number of times an even has been set, the number of times an event indicator has been cleared, the number of times an event indicator has been set when it is already set, and the number of times an event indicator has been cleared when it is already cleared. In some embodiments, the utilization rate (e.g., instantaneous utilization rate or accumulated average utilization rate) of the processing engine may be determined and displayed to users through the graphic user interface.

In some embodiments, the set of events may be mapped to labels in the model of the neural network, and the execution timeline of the instructions by the processing engines may be mapped to an execution timeline for the model of the neural network.

Optionally, at block 860, a graphical user interface may graphically display the execution timeline of executing the instructions for the network by the integrated circuit, such that the performance of the integrated circuit can be visualized. In some embodiments, an execution timeline for the model of the neural network may be graphically displayed as well.

Optionally, at block 870, the processor may identify, based on execution timelines, an operation or a hardware component of the implemented neural network, or an operation in the neural network model, as a performance bottleneck of the neural network. The software and/or hardware of the neural network may be modified to improve the performance of the neural network at the identified bottlenecks. For example, the compiler may recompile the neural network to generate optimized instruction sets to change the assignment of the network operations to the processing engines, change the order of the execution of the instructions, or change the network hardware resource that may be associated with the bottlenecks.

Figure 9:
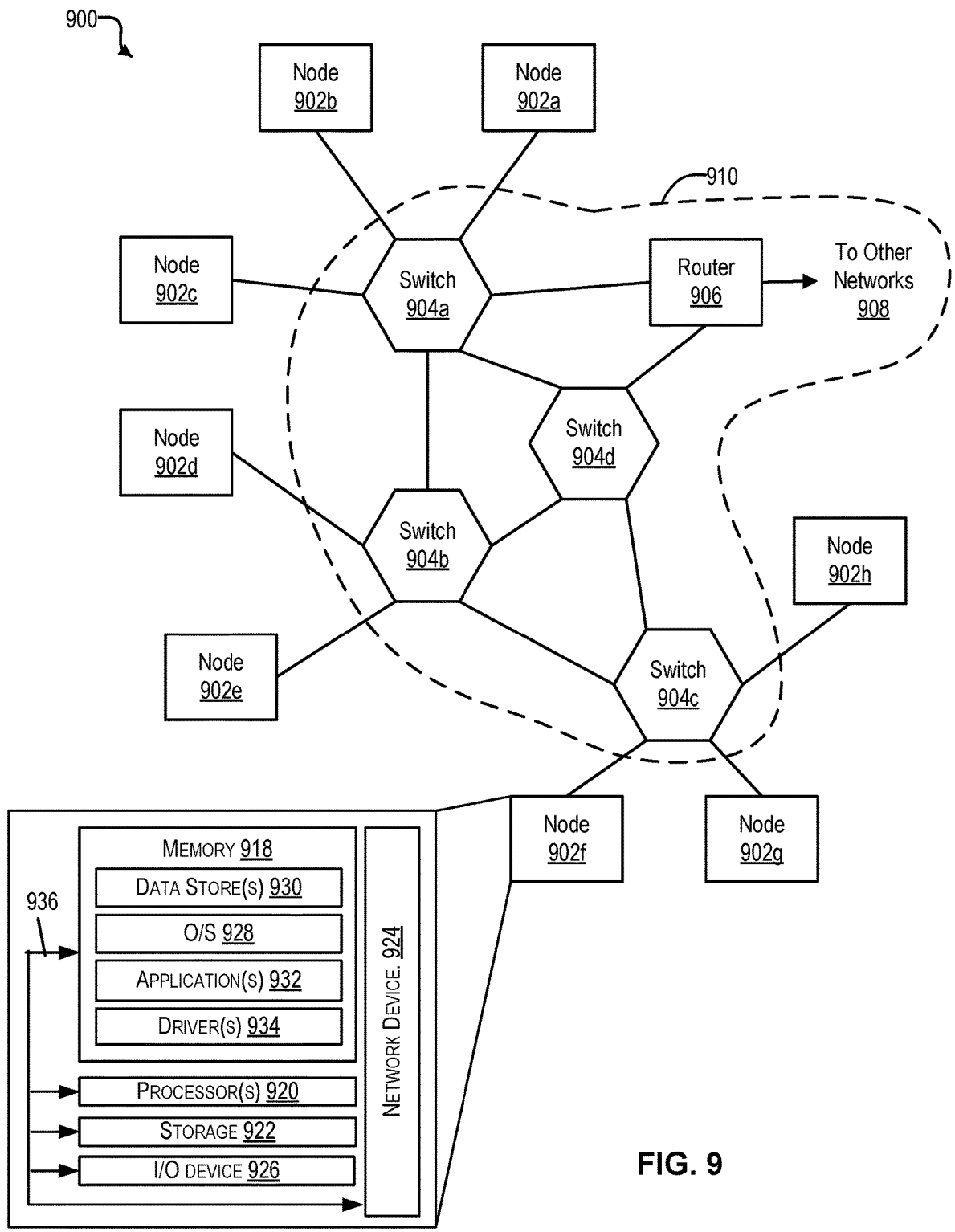
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
  generating, by a compiler and based on a model of a neural network, executable instructions for processing engines in an integrated circuit to implement the neural network;
  executing, by the processing engines, the executable instructions, wherein executing the executable instructions comprises, for each operation in a set of operations,
    clearing an event indicator for an event associated with the operation;
    triggering the operation; and
    waiting for the event indicator to be set after the operation is completed;
  for each event indicator set or cleared while executing the executable instructions by the processing engines:
    generating, by a notification generation circuit, a corresponding event notification message including an identification of the corresponding event and a timestamp indicating a time when the event indicator is set or cleared; and
saving the event notification message in a memory device; and
determining, by a processor based on event notification messages saved in the memory device, an execution timeline of the executable instructions executed by the processing engines.

2. The method of claim 1, wherein:
the processing engines comprise a first processing engine and a second processing engine;
the first processing engine is configured to:
    clear a particular event indicator associated with a particular operation;
    trigger the second processing engine to perform the particular operation; and
    wait for the particular event indicator to be set; and
the second processing engine is configured to:
    perform the particular operation; and
    set the particular event indicator after performing the particular operation.

3. The method of claim 2, wherein:
the first processing engine is configured to clear the particular event indicator by clearing a register corresponding to the particular event indicator and associated with the first processing engine;
the second processing engine is configured to set the particular event indicator by sending a signal to write to the register; and
the notification generation circuit is configured to generate a particular event notification message associated with the particular event indicator when a value in the register changes.

4. The method of claim 1, wherein the execution timeline includes:
a time difference between a time when a first event indicator is set and a time when a second event indicator is set;
a time difference between a time when the first event indicator is cleared and a time when the second event indicator is cleared;
a time difference between the time when the first event indicator is set and the time when the second event indicator is cleared; or
a time difference between the time when the first event indicator is cleared and the time when the first event indicator is set.

5. An integrated circuit comprising:
a first processing engine configured to execute instructions based on an event, wherein executing the instructions by the first processing engine changes status of an event indicator associated with the event;
an event register associated with the event indicator;
a first condition notification circuit associated with the first processing engine, wherein the first condition notification circuit is configurable to:
    detect a change of status of the event indicator based on a change of value in the event register;
    generate, based on detecting the change of status, a first notification message including an identification of the event and a timestamp indicating a time when the change of status occurs;
a memory device; and
a first interface to the memory device, wherein the first interface is configured to save the first notification message into the memory device,
wherein the first processing engine is configurable to:
    clear the event register;
    trigger an execution of an operation; and
    wait for the event register to be set after the execution of the operation completes.

6. The integrated circuit of claim 5, wherein the memory device is configured to store a set of notification messages associated with a set of events, the memory device accessible by a processor configured to determine, based on the set of notification messages stored in the memory device, an execution timeline of executing the instructions.

7. The integrated circuit of claim 5, further comprising:
a second processing engine configured to:
    wait for the first processing engine to trigger the execution of the operation;
    execute the operation; and
    set the event register after the execution of the operation completes.

8. The integrated circuit of claim 7, wherein the operation comprises:
moving data by the second processing engine; or
executing instructions by the second processing engine.

9. The integrated circuit of claim 7, further comprising:
a second condition notification circuit associated with the second processing engine, wherein the second condition notification circuit is configurable to:
    detect a change of status of a second event indicator associated with a second event;
    generate, based on detecting the change of status of the second event indicator, a second notification message including an identification of the second event and a timestamp indicating a time when the change of status of the second event indicator occurs; and
a second interface to the memory device, wherein the second interface is configured to save the second notification message into the memory device.

10. The integrated circuit of claim 9, wherein the timestamp of the first notification message and the timestamp of the second notification message are generated based on a same clock.

11. The integrated circuit of claim 7, wherein execution of the first processing engine and execution of the second processing engine are coordinated based on statuses of a set of event indicators.

12. The integrated circuit of claim 5, wherein the first condition notification circuit is configurable to generate notification messages for only a subset of events in a set of events associated with the first processing engine.

13. A method comprising:
executing instructions by a processing engine of an integrated circuit based on a set of events;
setting or clearing a set of event indicators corresponding to the set of events based on the executing;
for each event indicator in the set of event indicators set or cleared during the executing:
    generating, by a notification generation circuit associated with the processing engine, a corresponding notification message including an identification of the corresponding event and a timestamp indicating a time when the event indicator is set or cleared based on a change of value in an event register; and
determining, by a processor and based on the corresponding notification message generated for each event corresponding to the set of event indicators set or cleared during the executing, an execution timeline of the instructions executed by the processing engine, wherein for each event of the set of events, the processing engine:
   clears the event register,
   triggers an execution of an operation, and
   waits for the event register to be set after the execution of the operation completes.

14. The method of claim 13, further comprising:
identifying, based on the execution timeline of the instructions by the processing engine, an event or a component of the integrate circuit as associated with a performance bottleneck.

15. The method of claim 13, further comprising:
generating, by a compiler and based on a model, the instructions to implement the model in multiple threads;
mapping the set of events to labels in the model; and
mapping the execution timeline of the instructions executed by the processing engine to an execution timeline for the model.

16. The method of claim 13, further comprising:
displaying, on a graphic user interface, the execution timeline of the instructions executed by the processing engine.

17. The method of claim 13, wherein determining the execution timeline of the instructions by the processing engine comprises determining:
   an execution time associated with a particular event;
   a latency associated with the particular event; or
   a data transfer rate associated with the particular event.

18. The method of claim 13, wherein setting or clearing the set of event indicators based on the executing includes:
writing, by the processing engine or another processing engine of the integrated circuit, to a set of event registers corresponding to the set of event indicators.

* * * * *